(No Model.)
L. E. SLOAN.
CAR COUPLING.
No. 295,684. Patented Mar. 25, 1884.
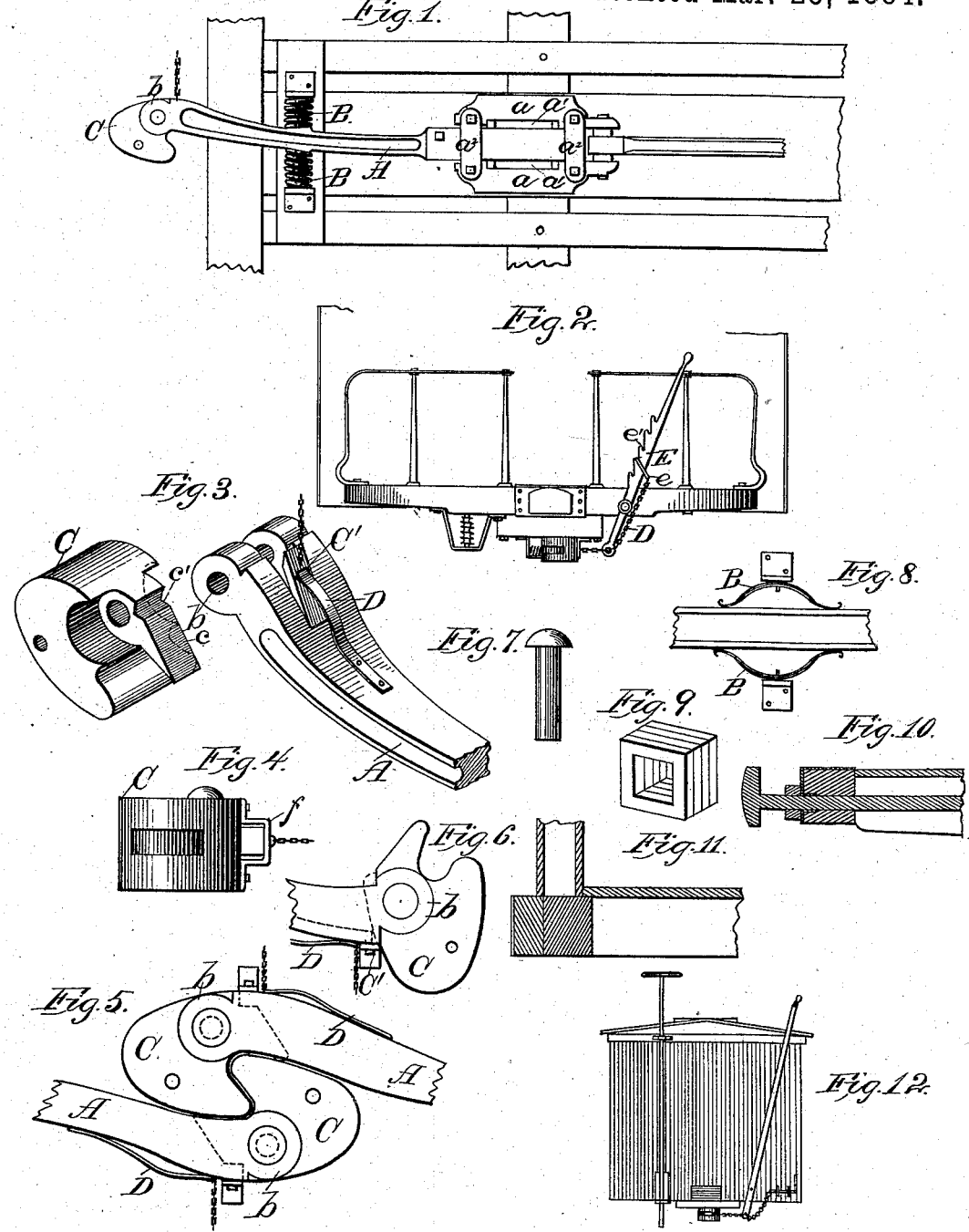
Witnesses:
E. L. Asmus
Adolph Klein
Inventor:
Leander E. Sloan
by Thirst & Underwood
Attorneys.

UNITED STATES PATENT OFFICE.

LEANDER E. SLOAN, OF MILWAUKEE, WISCONSIN.

CAR-COUPLING.

SPECIFICATION forming part of Letters Patent No. 295,684, dated March 25, 1884.

Application filed February 21, 1883. (No model.)

*To all whom it may concern:*

Be it known that I, LEANDER E. SLOAN, of Milwaukee, in the county of Milwaukee and State of Wisconsin, have invented certain new and useful Improvements in Car-Couplings; and I do hereby declare that the following is a full, clear, and exact description thereof.

My invention relates to devices for coupling railroad-cars together, and will be fully described hereinafter.

In the drawings, Figure 1 is a bottom view of my device. Fig. 2 is a front view of it in position on a passenger-car, and Fig. 12 is a like view of it in position on a freight-car.

The remaining views are details of various parts.

A is the draw-bar, the shank of which is held in position between two guides, $a\ a$, by a spring, $a'$, and plates $a^2$, substantially as the shank of the draw-head is in the well-known Miller coupling, or in any other suitable manner. B B are springs for centering the draw-bar, and C is the coupling or draw-head.

The connection between the draw-head and draw-bar is clearly shown in detail, Fig. 3, and is as follows: The front end of the draw-bar has ears $b$, which are bored out to take a connecting-pin, and the head has a central flange, $c$, that fits loosely in between the ears $b$, has a pin-hole, and is notched at $c'$ to take a pawl, $C'$, that is pivoted to the draw-head, and projects forward between the ears $b$; and D is a spring for causing the pawl $C'$ to fall into place behind the notch $c'$. The pawl $C'$ is connected by a chain, $D'$, with a lever, E, that is pivoted to the front of the car or platform, the chain passing through an opening in the lower end of the lever E, and then extending up to a loop, $e$, which slides over the lever E and engages with notches $e'$ thereon, in which it may be adjusted up and down to regulate the length of the chain. On freight-cars I may use a lever, E, from which an arm extends to the top and another to the side of the car, so that the pawl $C'$ may be drawn out of engagement with the head C by an operator standing on the ground or on the top of the car.

In Fig. 5 I have shown two draw-heads in engagement, and in Fig. 6 I have shown a draw-head in the position it would be left in by the separation of another head from it after the pawl $C'$ has been drawn out of engagement with the head C.

Figs. 9, 10, and 11 show spring-buffers.

It will be perceived that the draft on the head C will be inside of the pin, so that but for the pawl $C'$ the head would be revolved on its axis and disconnection would result; but while the pawl is in place the head will be held firmly against any ordinary strain.

It is immaterial when the cars come together whether the heads be locked, as shown in Fig. 5, or open, as in Fig. 6. If two draw-heads come together with their heads locked by the pawl $C'$, then they will wedge each other aside against the pressure of springs B until they have passed each other far enough for their hooks to engage; but if one head should be turned on its pivot, as shown in Fig. 6, then the point of the hook of the other will force its rear end back in between the ears $b$, so that its notch will be caught by the pawl $C'$, and to insure this action I make the rear portion of each head thicker somewhat than the width of the slot between the ears, so that the hook of an opposing draw-head will be sure to force it back far enough; and to further insure the closing of each head, I may provide the lever E with an arm on its lower end that, when the lever is thrown into the position shown in Fig. 2, will strike the head and force it into position.

I prefer to pivot the lever E to the outer edge of the platform, as by so doing I need not weaken the front beam, and there is no slot for accumulation of ice, snow, and cinders.

In Fig. 1 I have shown spiral centering springs; but I may substitute any other form of spring for them. For instance, that shown in Fig. 8, in which B B are semi-elliptic springs, which are secured to their supports by vertical pivots that permit to rock with the draw-bar.

I provide a slot and pin-hole in the front of each head to take the ordinary link and pin, and if it should be found that such a coupling makes too much slack between cars, then the headway may be removed and the coupling made between ears $b$. This may be used on any platform with very slight changes on the latter.

I propose to provide a housing for spring

D, and I may use any kind of a spring in its stead.

As my improved draw-bar has a spring, B, on each side of it, it will yield laterally to permit the head of an opposing hooked draw-bar to pass beyond and engage with its hook, and whether or not the opposing draw-head be open or closed, or whether or not its own draw-head is open or closed, it is just as certain to couple and when coupled will remain coupled regardless of the vibration caused by curves in the track until the head is unlocked by the withdrawal of the pawl C'.

My draw-heads never have to be set, as they are always ready for coupling, and they will be equally useful for freight as for passenger cars.

What I claim as my invention, and desire to secure by Letters Patent, is—

A draw-bar adapted to yield laterally against springs, and having a pivoted hooked head and locking-pawl, in combination with lever E, having notches $e'$, and chain having loop $e$, as and for the purpose set forth.

In testimony that I claim the foregoing I have hereunto set my hand on this 29th day of January, 1883, in the presence of two witnesses.

LEANDER E. SLOAN.

Witnesses:
STANLEY S. STOUT,
ADOLPH KLEIN.